(12) United States Patent
Bell et al.

(10) Patent No.: US 6,766,343 B1
(45) Date of Patent: Jul. 20, 2004

(54) METHOD AND APPARATUS FOR COORDINATE SYSTEM CONVERSIONS

(75) Inventors: David M. Bell, Melbourne, FL (US); Dennis L. Maly, Melbourne Beach, FL (US); Timothy R. Culp, Rockledge, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/499,061

(22) Filed: Feb. 4, 2000

(51) Int. Cl.[7] ................................................. G06F 7/38
(52) U.S. Cl. .................................................... 708/442
(58) Field of Search .............................. 708/100, 206, 708/422; 709/224; 707/1, 503, 2; 455/436; 345/419

(56) References Cited

U.S. PATENT DOCUMENTS

| | | | | |
|---|---|---|---|---|
| 4,613,946 A | * | 9/1986 | Forman ...................... | 345/853 |
| 4,713,808 A | * | 12/1987 | Gaskill et al. .............. | 370/314 |
| 4,899,161 A | * | 2/1990 | Morin et al. ................ | 342/451 |
| 5,088,039 A | * | 2/1992 | Kugimiya et al. ............ | 704/4 |
| 5,216,627 A | * | 6/1993 | McClellan et al. ......... | 708/100 |
| 5,317,686 A | * | 5/1994 | Salas et al. ................. | 707/503 |
| 5,339,982 A | * | 8/1994 | Tardie ........................ | 220/708 |
| 5,483,567 A | * | 1/1996 | Swerdloff ....................... | 378/4 |
| 5,642,356 A | * | 6/1997 | Wenk ......................... | 370/337 |
| 5,652,862 A | * | 7/1997 | Hanson ...................... | 711/165 |
| 5,694,591 A | * | 12/1997 | Du et al. ...................... | 707/2 |
| 5,923,330 A | * | 7/1999 | Tarlton et al. .............. | 345/419 |
| 6,151,595 A | * | 11/2000 | Pirolli et al. .................... | 707/1 |
| 6,275,701 B1 | * | 8/2001 | Cerwall ...................... | 455/436 |
| 6,385,649 B1 | * | 5/2002 | Draves et al. .............. | 709/224 |

OTHER PUBLICATIONS

IBM, Positional Coordinate Conversion, 1995, IBM Technical disclosure bulletin, vol. 38, No. 4, pp. 573–582.*
Leslaw et al., an effective coordinates conversion algorithm for radar controlled anti–aircraft systems, 1998, IEEE, pp. 771–775.*
Mihai et al., Coordination based on obligation, 1998, IEEE, pp. 14–23.*
Shan et al., A new parallel and distributed shortest path algorithm for hierarchically clustered data networks, 1998, IEEE, pp. 841–855.*

* cited by examiner

Primary Examiner—Chuong Dinh Ngo
Assistant Examiner—Chat C Do
(74) Attorney, Agent, or Firm—Allen, Dyer, Doppelt, Milbrath & Gilchrist, P.A.

(57) ABSTRACT

A method for converting between source coordinates in a source coordinate system and target coordinates in a target coordinate system includes the step of defining a coordinate system conversion tree extending from a root coordinate system and branching to a plurality of other coordinate-systems including the source and target coordinate systems so that the source and target coordinate systems are connected to a common coordinate system other than the root coordinate system. Coordinate conversions are performed between the source and target coordinates along branches extending from the source coordinate system to the common coordinate system and to the target coordinate system without returning to the root coordinate system. Contextual data is associated with the coordinates to permit conversion to an adjacent coordinate system. Since coordinate conversions are performed with respect to a common coordinate system, a distributed framework of coordinate systems is provided for reliably converting coordinates between source and target coordinate systems. New coordinate systems can be readily added to the tree.

36 Claims, 7 Drawing Sheets

- NUMBER OF POSSIBLE CONVERSIONS GROWS EXPONENTIALLY ($y = n^2$)
- NUMBER OF EXPLICIT CONVERSIONS TO CODE GROWS LINEARLY ($y = 2n-1$)
- NUMBER OF CoordSys CONVERSIONS TO CODE STAYS CONSTANT ($y = 2$)

METHOD AND APPARATUS FOR COORDINATE SYSTEM CONVERSIONS

FIELD OF THE INVENTION

The present invention relates to the field of data processing, and, more particularly, to a method and apparatus for converting coordinates from a source coordinate system to a target coordinate system.

BACKGROUND OF THE INVENTION

Many scientific and engineering software applications require the conversion or transformation of coordinates from a source coordinate system to a target coordinate system. For example, different coordinate systems may be used for launching and tracking a satellite wherein each coordinate system supports a particular objective.

For instance, range personnel responsible for tracking the position of the satellite in orbit use a first coordinate system based upon a center of the earth coordinate system. A second coordinate system may be used by personnel responsible for a lower booster stage to launch the satellite from the launch pad. Likewise, a third coordinate system may be used by personnel responsible for an upper booster stage. The second and third coordinate systems are based upon coordinate systems with respect to the booster stages and the launch pad.

Converting coordinates between the different coordinate systems is necessary, which consequently, requires a coordinate conversion from the source coordinate system to the target coordinate system. Since there is no single coordinate system that is sufficient for describing the problem space of all the possible coordinate systems, software programmers define a coordinate system that is meaningful to their particular objective for launching and tracking the satellite.

Invariably, ambiguities arise when coordinate data is passed to another coordinate system and the source coordinate system is not known. These ambiguities can be documented, but this is an ineffective way to prevent common errors that may occur when coordinate data is used out of context. For example, coordinate data passed as meters may be interpreted as feet.

These types of problems are difficult to debug since the defect presents itself, not where the coordinate data was misinterpreted, but later in the process when the mistake eventually produces an errant result. Software programmers are forced to debug the problem from the symptom, i.e., the errant result, rather than the cause, i.e., misinterpretation of meters as feet.

Due to the unlimited number of coordinate systems that may be defined, it is difficult to provide a total solution space. In other words, it is difficult to provide a single coordinate system to be used by all the software programmers for launching and tracking the satellite. One approach is to have a centralized coordinate system. When the above described three coordinate systems are configured in a centralized coordinate system, there are nine possible coordinate conversions or transformations that can be performed. The nine possible coordinate conversions among the three different coordinate systems may be represented as AA, AB, AC, BA, BB, BC, CA, CB and CC. A disadvantage of this approach requires the software programmer to know the source and target coordinate system and the transformation to apply for each possible coordinate conversion.

Another disadvantage of the centralized coordinate system is its lack of adaptability to support coordinate conversion from the source coordinate system to a new coordinate system. To support a fourth coordinate system, for example, sixteen different coordinate conversions are required to be supported. Accordingly, seven new coordinate conversions must be defined by the software programmers, which can be represented by AD, BD, CD, DA, DB, DC and DD. Adding these additional coordinate conversions requires modifying existing software, which is undesirable since a new programming error could be introduced into software that has already been coded and verified. Consequently, there is a need for reliably converting coordinates between a source coordinate system and a target coordinate system, particularly when converting coordinates between the source coordinate system and a new coordinate system.

SUMMARY OF THE INVENTION

In view of the foregoing background, it is therefore an object of the present invention to provide a coordinate system framework that permits efficient conversions and is readily extensible for adding additional coordinate systems.

These and other objects, features and advantages in accordance with the present invention are provided by a method for converting between source coordinates in a source coordinate system and target coordinates in a target coordinate system comprising the step of defining a coordinate system conversion tree extending from a root coordinate system and branching to a plurality of other coordinate systems including the source and target coordinate systems so that the source and target coordinate systems are connected to a common coordinate system other than the root coordinate system. Coordinate conversions are preferably performed between the source and target coordinates along branches extending from the source coordinate system to the common coordinate system, and to the target coordinate system without returning to the root coordinate system. In other words, the source and target coordinate systems are thus related through a coordinate system conversion tree which does not require conversion back to the root coordinate system.

The method preferably further comprises associating contextual data with respective coordinates of each coordinate system for performing coordinate conversions with at least one adjacent coordinate system.

One advantageous feature of using a coordinate system conversion tree is that the contextual data associated with each coordinate system allows conversion to an adjacent coordinate system without the source coordinate system having knowledge of how to convert the coordinates to the target coordinate system. The step of performing coordinate conversions preferably comprises sequentially performing coordinate conversions up the coordinate system conversion tree from the source coordinate system to at least one adjacent coordinate system until a conversion is made with the common coordinate system. Likewise, the step of performing coordinate conversions preferably comprises sequentially performing coordinate conversions down the coordinate system conversion tree from the common coordinate system to at least one adjacent coordinate system until a conversion is made with the target coordinate system.

A centralized coordinate system is advantageously avoided since coordinates can be converted to an adjacent coordinate system based upon the associated contextual data of the respective coordinate system. Since coordinate conversions are performed with respect to a common coordinate system, a distributed framework of coordinate systems is provided for reliably converting coordinates between source and target coordinate systems.

The method preferably further comprises the steps of adding an additional coordinate system to the coordinate system conversion tree, and verifying whether the additional coordinate system is connected to at least one other coordinate system via a common coordinate system. Coordinate conversions between the source coordinate system and the new coordinate system are performed if the verifying is successful. If the step of verifying is unsuccessful, then a warning is preferably provided.

In addition, the method according to the present invention is scalable. The amount of modules to code for adding a new coordinate system remains constant while the amount of functionality added to the system, i.e., number of possible conversions, grows linearly. The distributed framework of coordinate systems can be extended to support any user-defined coordinate system without modifying previously defined coordinate systems. The framework is both open to extension and closed to modification of pre-existing, working tested code. Since no modifications are required to the basic framework, the method can be provided as a set of commercial off-the-shelf (COTS) header files and shared libraries that are extended through derivation to meet the needs of a particular user. The user's new coordinate system simply plugs into the set of pre-defined coordinate systems, and are able to participate in conversions to any related coordinate system thereafter via the coordinate system conversion tree.

The coordinate systems may comprise an atomic coordinate system, a geospatial coordinate system, or an n-dimensional coordinate system.

Another aspect of the present invention is to convert between source coordinates in a source coordinate system and target coordinates in a target coordinate system by defining at least a portion of a coordinate system conversion tree extending from a common coordinate system and branching to the source and target coordinate systems with at least one intervening intermediate conversion system therebetween. Coordinate conversions are preferably performed between the source and target coordinates along branches extending from the source coordinate system to the common coordinate system and to the target coordinate system. The coordinates preferably have contextual data associated therewith for each respective coordinate system for performing coordinate conversions with at least one adjacent coordinate system.

A further aspect of the present invention is to provide a machine readable medium having machine readable instructions thereon for causing a computer to convert between source coordinates in a source coordinate system and target coordinates in a target coordinate system as discussed above.

Yet another aspect of the present invention is to provide an apparatus comprising a processor for converting image data at source coordinates in a source coordinate system to target coordinates in a target coordinate system. The processor preferably performs the step of defining at least a portion of a coordinate system conversion tree extending from a common coordinate system to the source and target coordinate systems with at least one intervening intermediate conversion system therebetween. Coordinate conversions of the image data are preferably performed between the source and target coordinates along branches extending from the source coordinate system to the common coordinate system and to the target coordinate system. The apparatus also includes a display for displaying the converted image data.

The coordinates preferably have contextual data associated therewith for each respective coordinate system for performing coordinate conversions with at least one adjacent coordinate system.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
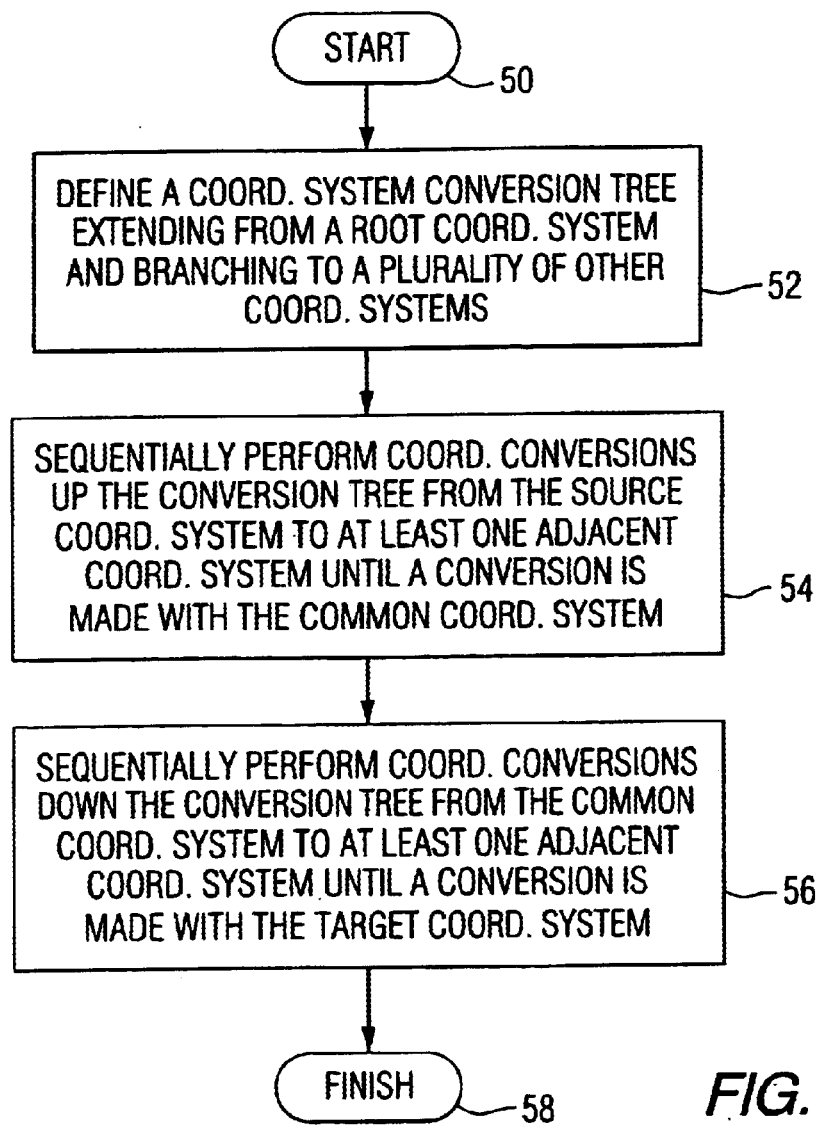
FIG. 1 is a flowchart illustrating a method for converting between source coordinates in a source coordinate system and target coordinates in a target coordinate system in accordance with the present invention.
Figure 2:
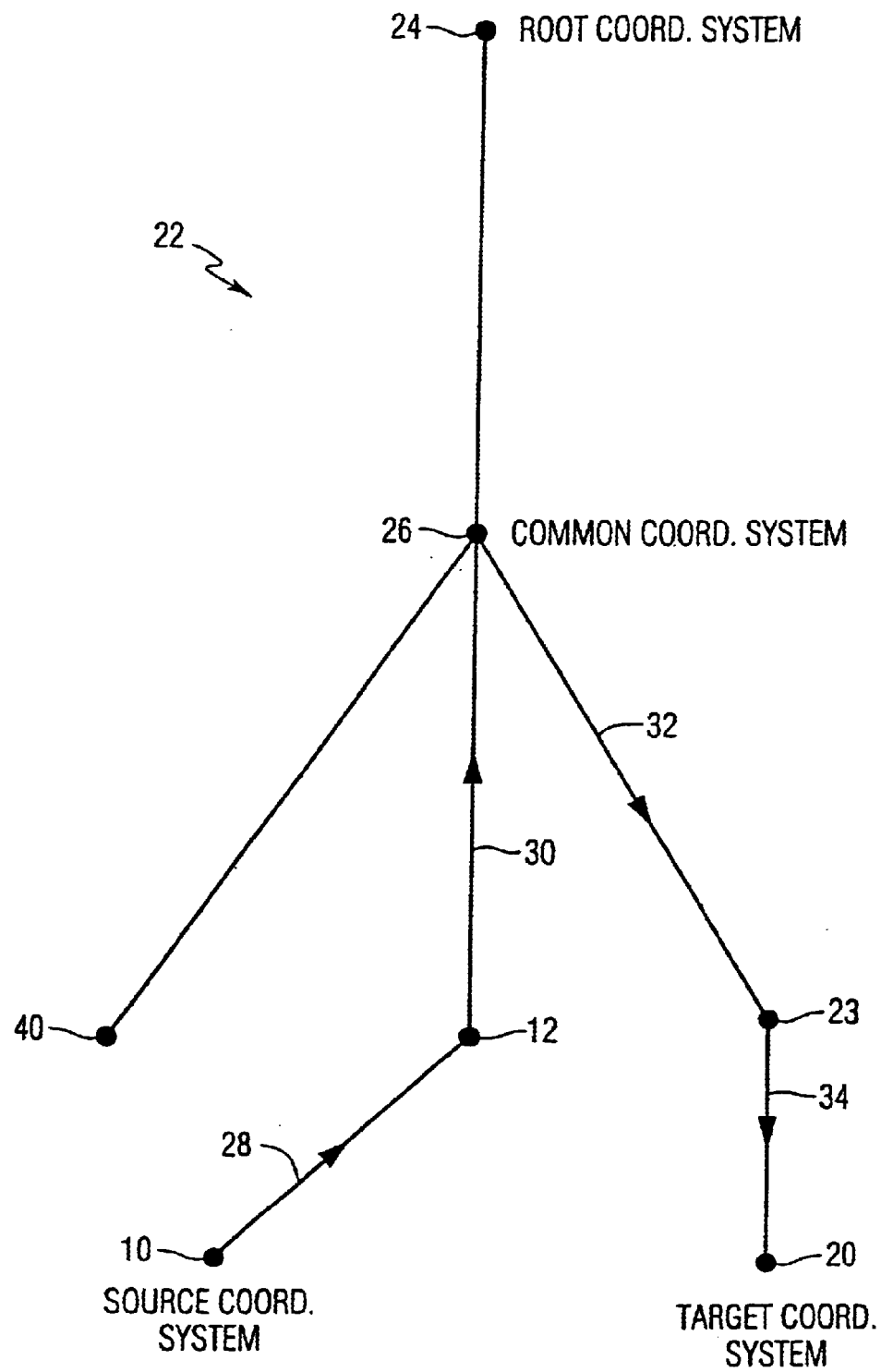
FIG. 2 is a coordinate system conversion tree in accordance with the present invention.
Figure 3:
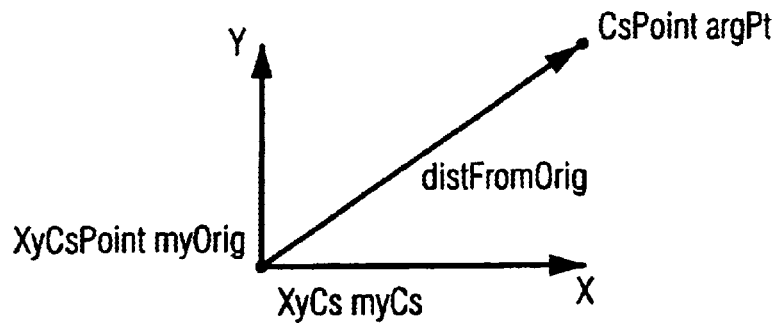
FIGS. 3–6 are various coordinate system conversions illustrating the method of the present invention.

A method for converting between source coordinates in a source coordinate system 10 and target coordinates in a target coordinate system 20 in accordance with the present invention will initially be described with reference to FIGS. 1 and 2. From the start (Block 50), a coordinate system conversion tree 22 is defined at Block 52 extending from a root coordinate system 24 and branching to a plurality of other coordinate systems including the source and target coordinate systems 10, 20 so that the source and target coordinate systems are connected to a common coordinate system 26 other than the root coordinate system. Coordinate conversions are performed between the source and target coordinates along branches 28, 30, 32 and 34 extending from the source coordinate system 10 to the common coordinate system 26 and to the target coordinate system 20 without returning to the root coordinate system 24.

The source and target coordinate systems 10, are thus related through a coordinate system conversion tree 22 extending from a root coordinate system 24 and branching to a plurality of other coordinate systems including the source and target coordinate systems. The method further comprises associating contextual data with respective coordinates of each coordinate system for performing coordinate conversions with at least one adjacent coordinate system.

One advantageous feature of using a coordinate system conversion tree 22 is that the contextual data associated with each coordinate system allows conversion to an adjacent coordinate system without the source coordinate system 10 having knowledge of how to convert the coordinates to the target coordinate system 20. The step of performing coordinate conversions includes sequentially performing coordinate conversions up the coordinate system conversion tree 22 from the source coordinate system 10 to at least one adjacent coordinate system 12, for example, until a conversion is made with the common coordinate system 26 at Block 54. Likewise, the step of performing coordinate conversions includes sequentially performing coordinate conversions down the coordinate system conversion tree 22 from the common coordinate system 26 to at least one adjacent coordinate system 23, for example, until a conversion is made with the target coordinate system 20 at Block 56. The conversion is complete at Block 58.

A centralized coordinate system is advantageously avoided since coordinates can be converted to an adjacent coordinate system based upon the associated contextual data of the respective coordinate system. Since coordinate conversions are performed with respect to a common coordinate system 26, a distributed framework of coordinate systems is provided for reliably converting coordinates between source and target coordinate systems.

Another method aspect relates to the ease of adding an additional coordinate system 40 to the coordinate system conversion tree 22. If an additional coordinate system is added, the method may include verifying whether the additional coordinate system is connected to at least one other coordinate system via a common coordinate system. Coordinate conversions between the source coordinate system 10 and the new coordinate system 40 are performed if the verifying is successful. If the step of verifying is unsuccessful, then a warning is preferably provided.

The method according to the present invention is thus type safe and run-time safe. It is type safe because the compiler will prevent errant operations between coordinate systems that are not connected to at least one other coordinate system via a common coordinate system. It is run-time safe because exceptions are flagged for errant operations between coordinate systems that are not connected to at least one other coordinate system via a common coordinate system. For example, if coordinate data was converted to meters instead of feet, then software programmers can isolate the error without having to debug a larger portion of the software program.

Referring now to FIGS. 3–12, the method for converting coordinate data between source and target coordinate systems will now be described in greater detail. The method according to the present invention is based upon a framework of a set of distributed, scalable, object-oriented coordinate system transformation classes and geometric objects. Hereinafter, this framework will be simply referred to as CoordSys.

CoordSys is applicable to geospatial information processing systems (for geospatial coordinate systems) although it can be used in any software application domain that has a requirement for converting coordinate data from one coordinate system to another. CoordSys can be used for synchronizing objects in applications with different systems or scenario times (1-dimensional coordinate systems), planar transformations in any mathematical application (2-dimensional coordinate system) or spatial transformations in imagery or topographical applications (3-dimensional coordinate systems). CoordSys can also be used to define ad-hoc coordinate systems with an arbitrary number of components (N-dimensional coordinate systems).

CoordSys objects are said to be coordinate system-safe. In other words, they cannot be used out of context. Any attempt to use a CoordSys object with an object from a different coordinate system will result in either a compile-time or run-time error. Referring to the coordinate system illustrated in FIG. 3, the incoming argument point is incorrectly assumed to be in the user's coordinate system. Here the user is trying to calculate the distance from their origin to the incoming argument point, as provided by the following code.

```
void Myclass::someMethod (const CsPoint& argpt)
    {XyCsPoint Myorig(myCs, 0, 0);
    XyCsVector distfromOrig=argPt-myOrig; //
    Compile error!
    ...}
```

Figure 4:
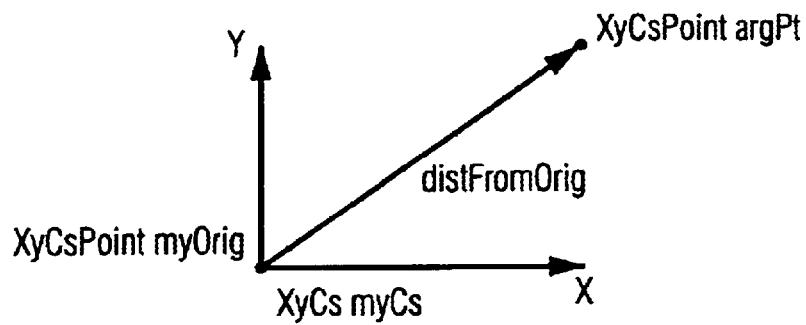

This generates a compile time error because you cannot subtract a base class CsPoint from a subclass XyCspoint. Only another XyCsPoint can be subtracted from an XyCsPoint. The strong type checking in the CoordSys framework is the first level of protection against using data out of context. One way to get past the compiler is to change the signature of the method so it explicitly takes an XyCspoint. But this can still be a problem as shown in FIG. 4 and in the code below.

```
void Myclass::someMethod (const XycsPoint& argPt)
    {XyCsPoint myOrigin (myCs, 0, 0);
    XyCsVector distFromOrig=argPt-myOrig; //
    Runtime error!
    ...}
```

Figure 5:
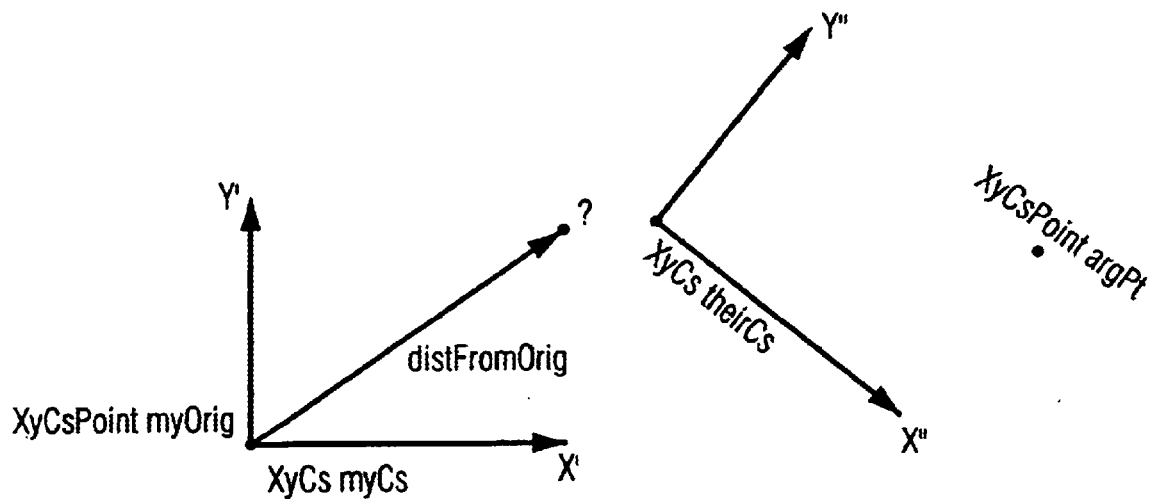

This generates a runtime exception because you can not just subtract any two XyCsPoints from each other. They have to be in the exact same coordinate system. The run-time coordinate system check in the CoordSys framework is the second level of protection against using data out of context. This is referred to as a run-time error because the programmer has an errant perspective of the incoming data. While the programmer believes the incoming point to be in their own coordinate system, it is actually coming from another XyCs that is translated and rotated from the original. The correct view of the two systems are shown in FIG. 5, and the programmer's mistake now becomes obvious.

Figure 6:
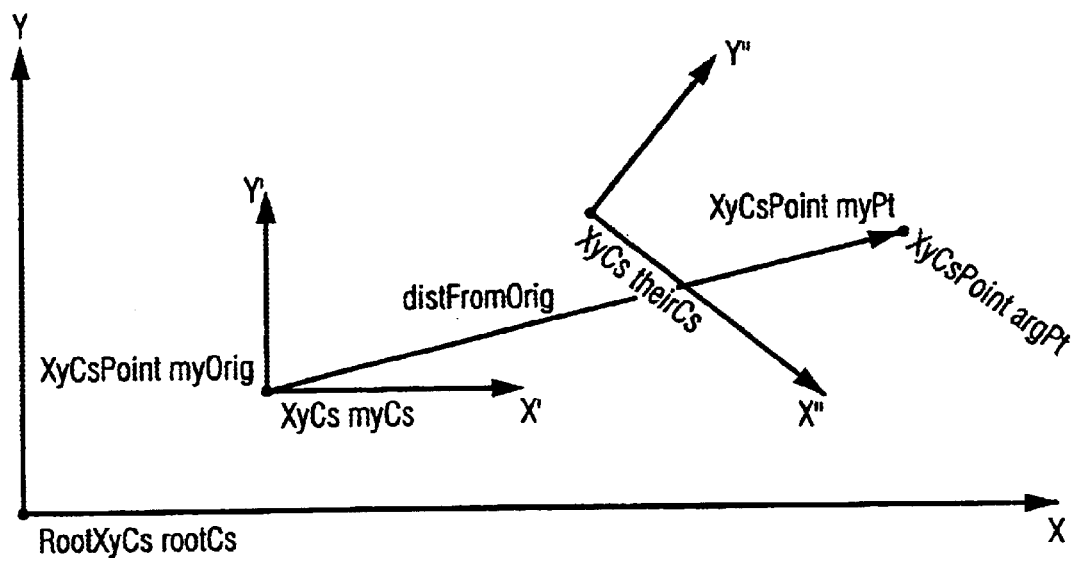

CoordSys does not just prevent common mistakes but also allows programmers to convert incoming arguments without any apriori knowledge of the type of the incoming coordinate system. Since the incoming argument is CsPoint, it carries with it the heritage information to its rootCs that it needs to convert to any other related coordinate system. The proper approach is to first convert argpt to the target coordinate system and then use the object with confidence, as shown in FIG. 6 and in the following code:

```
void MyClass::someMethod (const CsPoint& argPt)
    {XyCspoint myOrig(myCs, 0, 0);
    XyCsPoint myPt(mycs, argPt); // explicit conversion
    XyCsVector distfromOrig=myPt-myOrig; // Ok!
    ...}
```

The incoming argument is converted to the user's coordinate system in a relatively straightforward manner:

XyCsPoint myPt(myCs, argPt);

As long as the incoming point is in some way related to the same root coordinate system, the CoordSys conversion algorithm will be able to create a point in the context of any of the participating coordinate systems. In general, you can create an object in your own coordinate system from an object in any related coordinate system:

cs-object-type my-object(my-cs, their-object);

CoordSys is thus defined as a reference used to define geometrical objects. A point is a geometric object defined by stating the value of its coordinates, e.g., (x,y,z)=(5,6,2). The definition of the magnitude and meaning of the coordinate values is the coordinate system. Most coordinate systems are defined relative to another coordinate system. That means that the coordinate system knows the existence of its reference coordinate system, and knows how to convert objects between itself and its reference.

Figure 7:
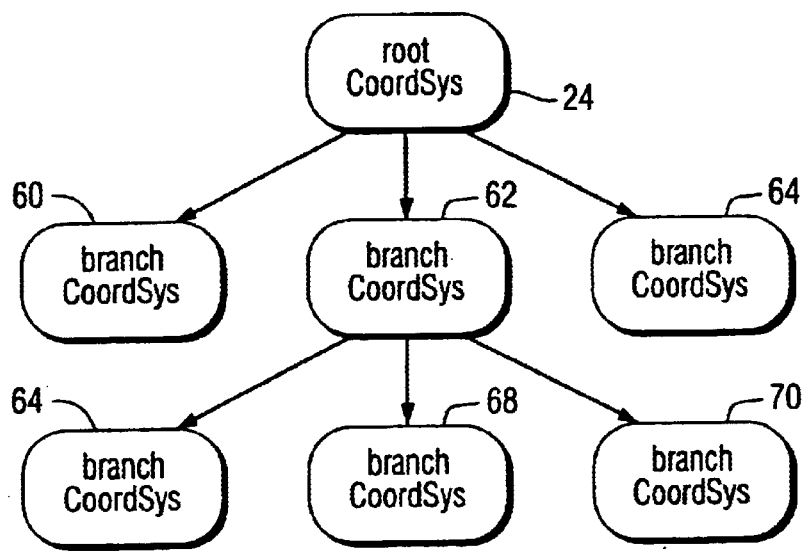
FIG. 7 is another version of the coordinate system conversion tree illustrated in FIG. 2.

Some coordinate systems can be defined in a stand alone fashion. That is, they are not defined relative to another coordinate system. These stand-alone coordinate systems are referred to as root coordinate systems. The word root is used to imply a tree structure that exists among related coordinate systems as best shown in FIG. 7. One root coordinate system 24 can have many branch coordinate systems 60, 62, 64 defined relative to it. Each of those branch coordinate systems can, in turn, have additional branch coordinate systems 64, 66 and 68, for example. The number of root coordinate systems are generally much smaller than the number of branch coordinate systems. The relationships among related coordinate systems can become complex. One could derive mathematical equations to express any coordinate system relative to all other related coordinate systems. Those equations, however, would become highly redundant.

In the present invention, this relationship has been simplified by defining a branch coordinate system relative to only one reference or adjacent coordinate system. With this assumption, all coordinate systems that are related share a common root coordinate system. This means that an object defined in one coordinate system can be converted to any other related coordinate system by first converting it to the root coordinate system, and then converting it to the target coordinate system.

The efficiency of the coordinate system conversion can be improved by recognizing the potential existence of a common coordinate system that is not the root coordinate system. The example illustrated in FIG. 2 shows a coordinate system 26 that is common to both the source and target coordinate systems 10, 20. The conversion from the source to the target coordinate system 10, 20 can be accomplished more efficiently by eliminating unnecessary conversions. For example, converting from the source coordinate system 10 to the common coordinate system 26, and then from the common coordinate system to the target coordinate system 20 is more efficient than always converted back to the root coordinate system 24. Conversions between the common coordinate system 26 and the root coordinate system 24 are redundant and can be short-circuited for efficiency.

The basic conversion algorithm implementing the method of the present invention is recursive and makes repeated calls to convert to the reference coordinate system as it walks up the coordinate system conversion tree 22. As the recursion unwinds, repeated calls are made to convert from the reference coordinate system as it walks down the coordinate system conversion tree 22. Psuedo code for walking the conversion tree 22 is as follows:

Converted Point Algorithm
Expects: an argument point in some coordinate system
Returns: a converted point in this coordinate system {Get the source coordinate system from the incoming argument point,
Verify the source coordinate system is related to this coordinate system,
Create a work point which is a clone of the incoming argument point,
While the source coordinate system is higher in the conversion tree than this coordinate system'
{Create a new work point by converting the current work to it's reference coordinate system,
Set the source coordinate system to the new work point's coordinate system}
If the source coordinate system is not equal to this coordinate system,
{Create a new work point by calling the reference coordinate system's converted point method,
{Create a new work point by converting the current work from it's reference coordinate system}
return the work point.}

A coordinate system object in its most basic form is simply an object that knows how to convert points to and from its reference coordinate system. Since there are many types of coordinate systems, each with their respective names, number of components and conversion details, it is natural to think of a base class CoordSys that constructs from a reference coordinate system and two pure virtual functions, convToRef( ) and convFromRef( ):

class CoordSys
{public:
CoordSys(const CoordSys& refCs);
virtual CsPoint* convToRef (const CsPoint& thisCsPt)= 0;
virtual CsPoint* convFromref (const CsPoint& refCsPt)= 0;
. . . };

While this is a straightforward implementation of the desired goal, it implies that CoordSys objects will be dynamically allocated on the heap in order to exhibit polymorphic properties. Polymorphic follows the Liskov Substitution Principle that states when functions use pointers or references to base classes, they must be able to use objects of derived classes without knowing it. A user does not need to know the type of an object's coordinate system to convert an object to their own space. Conversions of derived types take care of themselves by making calls through a base class pure virtual interface.

This design is not run-time efficient if a large number of instances of CoordSys objects are going to be created because of the inherent costs associated with the overuse of operator new. Nor is it exception safe since an exception can be thrown after the construction of a CoordSys object, which in all likelihood will result in a memory resource leak.

Figure 8:
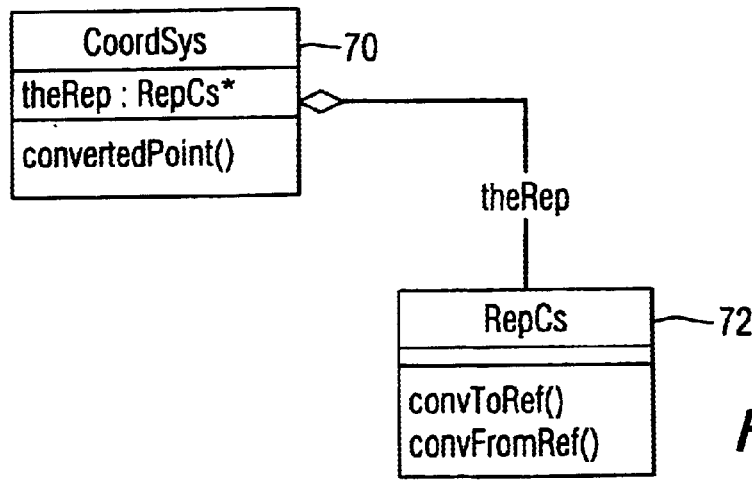
FIG. 8 is breakdown of the CoordSys object data in accordance with the present invention.

A safer and more efficient implementation is to break the CoordSys class into two parts, a non-virtual Proxy that has a virtual RealSubject (Design Patterns), as shown in FIG. 8. The CoordSys class 70 (Proxy) is statically allocated by the client which is a stand-in for the dynamically allocated RepCs 72 (RealSubject). The extra level of indirection provides several key benefits.

CoordSys objects are now exception safe because all the destructors will properly fire during the unwinding of a stack after an exception. The CoordSys class 70 can also employ a reference counting mechanism so that new RepCs's 72 are only allocated when a new CoordSys class is being constructed or changed. The RepCs object also is not deleted until the last CoordSys proxy goes out of scope removing any lifetime issues associated with passing around CoordSys objects. It provides a buffer between the programmers using the public CoordSys interface and the implementation of the private RepCs class. A conversion algorithm can be modified and a new shared library delivered to a developer that only requires a relinking of application code instead of a potentially costly recompile of an entire baseline.

A natural temptation exists to name the classes CoordSysProxy and CoorSys vice CoordSys and RepCs to highlight the special relationship that exists between them. Nevertheless, the Proxy-Rep pattern is an implementation detail that should be hidden from the user. A user-centric view reserves the elegant names for the Proxy classes since the names of the rep classes are never seen by the casual developer.

Taking the design to the next level of detail, there are basically two varieties of RepCs, namely the root and dependent coordinate systems, 74 and 76. A root coordinate system 74 is a coordinate system that has no reference and represents the root node in the conversion tree. We define a RepRootCs 74 that is a RepCs. The implementation of the convToRef and convFromRef will simply cause a logic error since the conversion algorithm will never call these methods. To do so would be tantamount to traversing above the root node of the tree.

Class RepRootCs: public RepCs { . . . };
CsPoint* RepRootCS::convToRef (const CsPoint&) const
{throw std::domain_error (" . . . ");}

A dependent coordinate system 76 is a coordinate system that has a root or another dependent coordinate system as a reference. It represents a leaf node in the coordinate system conversion tree 22. It has the knowledge of how to convert to and from its reference coordinate system or parent node. We define a RepDependentCs 76 that is a RepCs and has a reference CoordSys object. The convToRef and convFromRef methods are left virtual since the details of the transformations will be delegated to the concrete subclasses of RepDependentCs.

To illustrate the method, some concrete coordinate systems are defined. In one example, we use a root XY coordinate system that is a stand-alone coordinate system, and a translated X'Y' coordinate system. We define a RepRootXyCs 76 and a RepTransXyCs 78 that are derived from RepRootCs and RepDependentCs, respectively. The RepRootXyCs class 76 does not need to provide an implementation for conversion and exists solely to override some administrative virtual interfaces.

Example implementation of a coordinate system conversion is as follows. The RpTransXyCs 78 is a concrete subclass of RepCs, and, therefore, must provide an implementation for the pure virtual interface. Since it is a translated coordinate system, it is assumed that the translation components in the X and Y direction have been stored away at the time the class was constructed. It is also assumed that some higher level coordinate system conversion algorithm is responsible for calling the convToRef and. convFromRef methods at the appropriate time. The methods according to the present invention become relatively straightforward. For instance, the implementation for convToRef is as follows:

CsPoint*
RepTranXyCs::convToRef (const XyCsPoint & this CsPt) const
{// Create a point in the reference coordinate system
  XyCsPoint refCsPt (refCoordSys( ), 0.0, 0.0);
// –
// Convert the point in this coordinate system
// to the reference coordinate system
// –
refCsPt.x( )=thisCsPt.x( )+theTranslation.x( );
refCsPt.y( )=thisCsPt.y( )+theTranslation.y( );
// Return a new point in the reference coordinate system
  return new XyCsPoint (refCsPt);}

The incoming point is a point we know to be in this coordinate system. The method is responsible for allocating a new point in the reference coordinate system. A local point in the reference coordinate system is created with components initially set to 0. The components are then backfilled using the appropriate transformation algorithm. For the straightforward case of a translated. XY coordinate system, the translation in the X and Y directions are added to the incoming point components. Once the point has been converted, it is returned as a point dynamically allocated on the heap.

The convFromRef method is very similar. The incoming point is in the reference coordinate system. A local point is created in this coordinate system and the reverse transformation is applied. This case is the translation in the X and Y directions which are subtracted from the incoming point components. Again, a new point is allocated and returned to the caller.

CsPoint*
RepTranXyCs::convFromRef (const XyCsPoint & refCsPt) const
{// Create a point in this coordinate system XyCsPoint thisCsPt (thisCs, 0.0, 0.0);
// –
// Convert the point in the reference coordinate
// system to this coordinate system
this CsPt.x( )=refCsPt.x( )–the Translation.x( );
this CsPt.y( )=refCsPt.y( )–the Translation.y( );
// Return a new point in this coordinate system return new
  XyCsPoint (thisCsPt);

The transformations are intentionally verbose for purposes of clarity. The creation of a local temporary point is unnecessary and can be eliminated by passing all the arguments directly into the constructor for the returning point. The points are required to be returned dynamically as base class pointers since the higher level conversion algorithm is making calls to convToRef and convFromRef without specific knowledge of the point types for that coordinate system. The efficiency concerns are addressed later.

Figure 9:
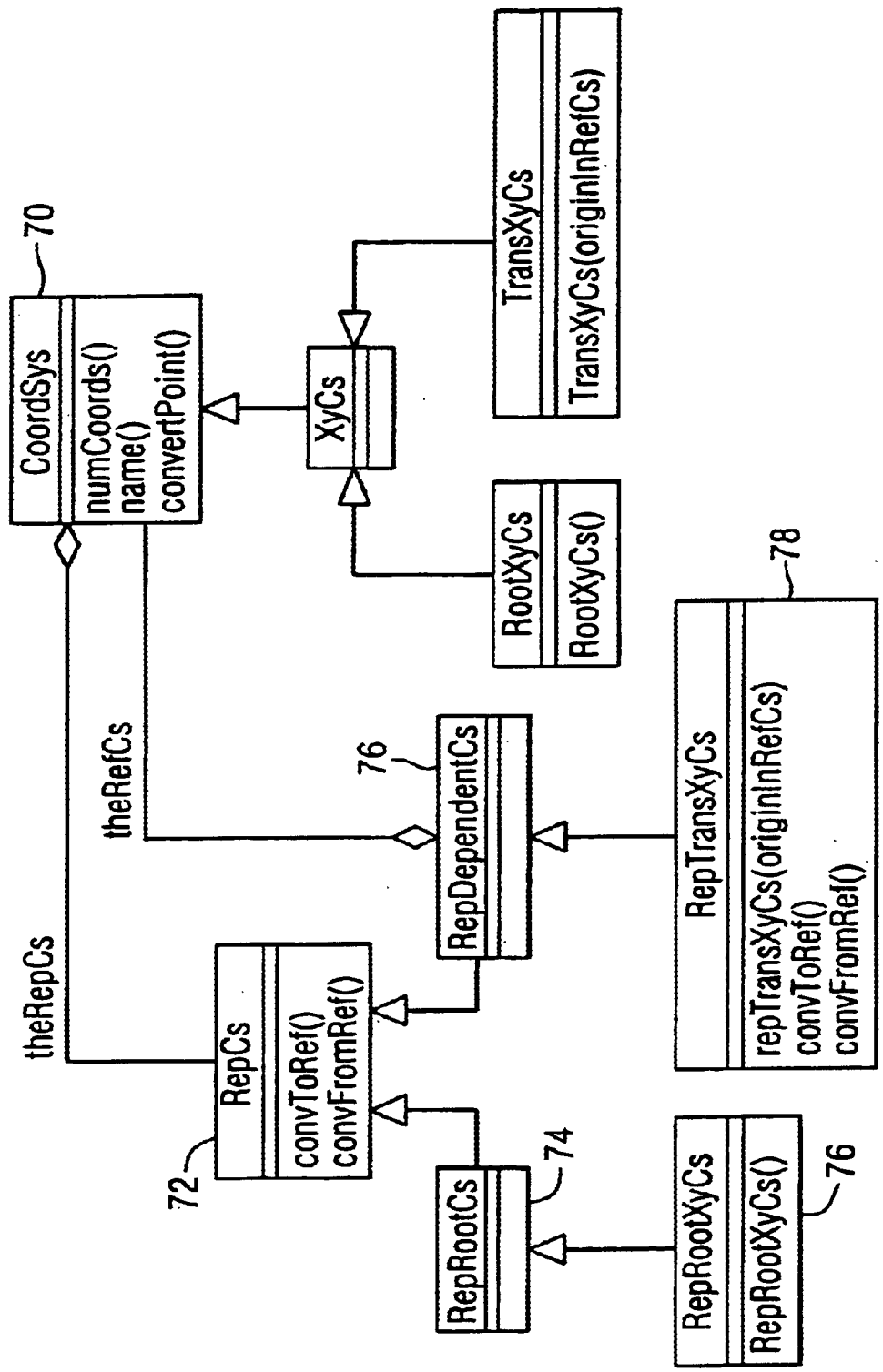
FIG. 9 is static view of the XY coordinate system classes in accordance with the present invention and how they are related.

Referring now to FIG. 9, a summary of the static view of the XY coordinate system classes discussed above and how they are related to each other are provided. Because of the unique design of chaining coordinate system references in a conversion tree and allowing the virtual mechanism to traverse the tree, the CoordSys framework is scalable. For every n coordinate systems, there are $n^2$ possible conversions. For example, if you have 2 coordinate systems, A and B, there are 4 possible transformations (A→A, A→B, B→A, B→B). Likewise, if there are 3 coordinate systems, there are 9 possible transformations.

Figure 10:
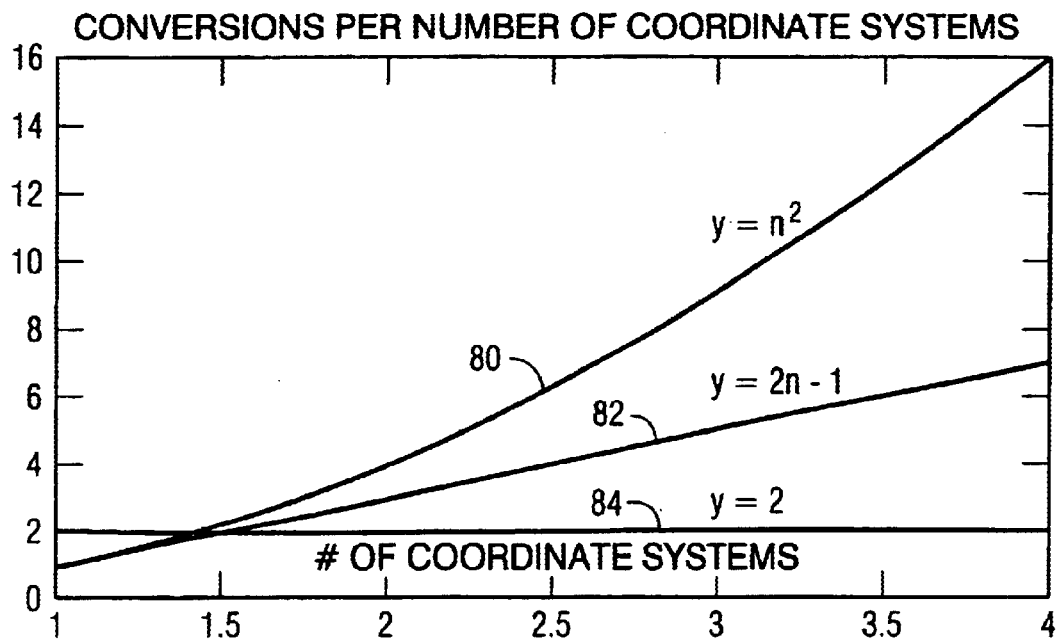
FIG. 10 are plots of the number of coordinate systems versus the conversions per number of coordinate systems in accordance with the present invention.

For every new coordinate system added to an application, there are 2n–1 explicit conversions to code in order for every coordinate system to be able to convert to every other coordinate system. By using the CoordSys framework, all $n^2$ conversions are supported simply by providing 2 new conversions, to and from their reference. This means the work remains constant while the functionality increases exponentially, as best shown in FIG. 10 by plots 80, 82 and 84.

Figure 11:
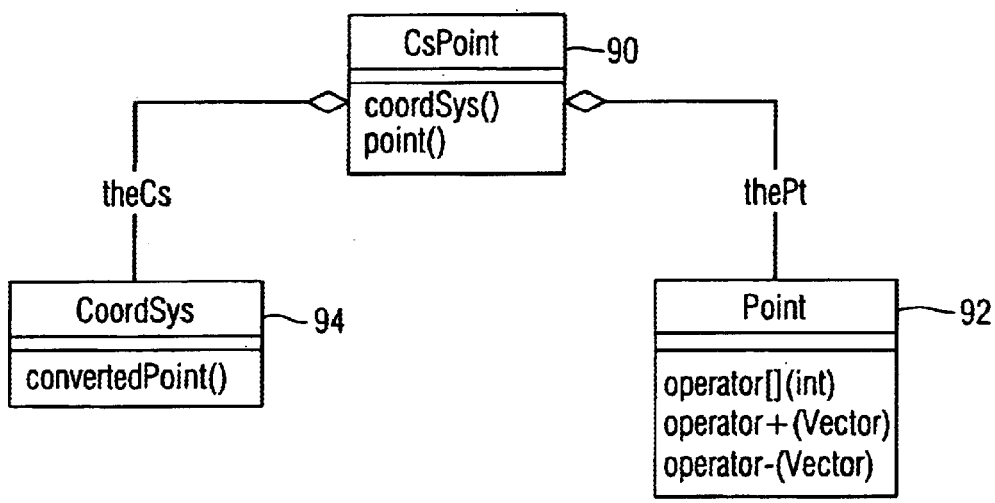
FIG. 11 is breakdown of the CoordSys geometric object data in accordance with the present invention.

The mechanics of coordinate system conversions is handled through coordinate system geometric objects, the simplest object being a CsPoint. A CsPoint 90 is an aggregation of a point object 92 and a coordinate system object 94, as shown in FIG. 11. The point object 92 stores the component values and provides all the behaviors that are expected of a point. The coordinate system contains the context information for the point and provides conversions when required. For simplicity, conversions are performed at the construction of a point. The construction parameters are the target coordinate system and an argument point.

XyCsPoint: XyCsPoint (const XyCs&TargetCs, const CsPoint& SrcPt)

: the Cs(TargetCs)

{// –

// Use the target coordinate system to convert the

// the incoming argument point

// – auto_ptr<CsPoint> newPt (TargetCs.

ConvertedPoint (SrcPt));

// Verify the new point created is the correct type
XyCsPoint*xyPt=dynamic_cast<XyCsPoint*> (newPt);

if (!xyPt.get( )) throw { . . . }

// Store the converted components thePt=xyPt→point ( );}

Referring back to the initial example provided above, chaining coordinate system objects together will now be discussed. We essentially have a problem space with three related XY coordinate systems, a root coordinate system XY, a translated coordinate system X'Y' and a translated-rotated coordinate system X"Y". The root coordinate system XY 100 is not dependent on any other and can simply be declared.

RootXyCs rootCs;

The translated coordinate system X'Y' is dependent on the root. In order to construct it, we simply create an XyCsPoint that represents our origin in the root coordinate system. This origin is used as a construction parameter for our TransXyCs 102.

XyCsPoint myOrigInRoot (rootCs, 1, 1);

TransXyCs myCs (myOrigInRoot);

The translated-rotated coordinate system X"Y" is also dependent on the root. We construct the coordinate system in two steps. First, we create a translated coordinate system 104 in the same fashion as before.

XyCsPoint theirOrigInRoot (rootCs, 3, 3):

TransXyCs theirTransCs (theirOrigInRoot);

Using this translated coordinate system as a reference, we can now build a dependent coordinate system 106 that is rotated counter-clockwise from the reference by the given number of degrees.

Figure 12:
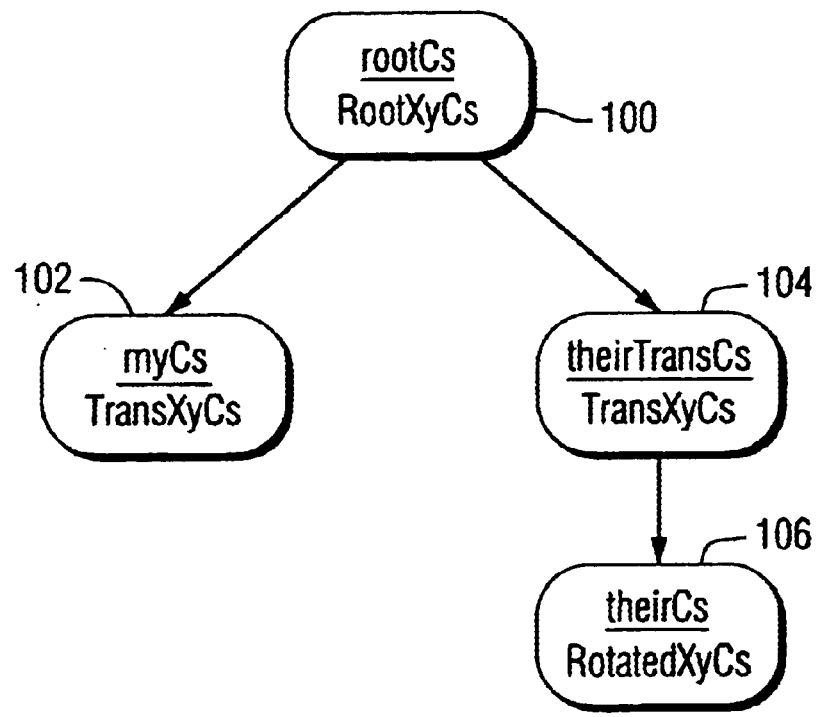
FIG. 12 is dynamic view of four coordinate system objects in accordance with the present invention and how they are related.

RotatedXyCs theirCs (transCs, Degrees (–45));

At this point we have constructed four coordinate system objects that are related as shown in the dynamic view of FIG. 12. With the coordinate system tree established through the construction of the CoordSys objects, coordinate system transformations occur with ease of use and object-oriented generality.

Somewhere in their code, a point is defined using their coordinate system:

XyCsPoint argPt (theirCs, 2, 2):

Eventually, this point is passed to my code. A coordinate system conversion rotates and translates back to the original root coordinate system while going up the conversion tree. The point is translated into our coordinate system going down the coordinate system tree. This conversion is done without any apriori knowledge of the point's heritage, simply by constructing their point in our coordinate system.

XyCsPoint mypoint (myCs, argPt)"// Q.E.D.

While generalization and abstraction are very powerful tools in object-orient design, the Applicants realize the affect of degraded run-time efficiency. There are a number of optimizations mentioned below that were incorporated to minimize the overhead of virtual function calls and heap allocation throughout the CoordSys framework.

The first and foremost optimization is the reference counting that is provided by the CoordSys proxy under the premise that coordinate systems will be created far less often then the number of times they are passes and copied within their respective lifetimes. This argument holds true in the image processing domain where coordinate systems are created when 1) opening image files or 2) user modifications to the viewer controls display of the image.

This is compared to the millions of times coordinate systems are used during the resampling and remapping of pixel information from image space (the satellite camera back plane), through a ground intersection surface (the earth), to the user's project scene space (a viewer on an X terminal). Reference counting replaces the majority of heap operations required to create a coordinate system with a simple increment and decrement of a counter variable within an already existing coordinate system.

The second most important optimization is the memory management of points during the recursive tree traversal. Since work points must be created without knowledge of the source coordinate system type, the points are dynamically allocated on the heap. A significant performance increase is obtained by maintaining a memory pool of different point types thereby replacing costly dynamic allocations with a simple push or pop of a point address to and from a stack of pre-allocated points. The memory pool can be designed to geometrically grow to the optimal size for a given application and conservative means provided for the garbage collection of points no longer being used.

Another significant improvement can be made by collapsing frequently visited nodes in the conversion tree to one optimized conversion. For instance, in the image processing domain the full resolution image space coordinate system (typically 136 Mb of pixel data) is normally repeatedly scaled by factors of 2 into several reduced resolution coordinate systems to make the data more manageable.

The skirt around the reduced images occasionally needs to be shifted by ½ pixels as the image resolution shrinks. Rather than chaining a translated raster coordinate system to a scaled raster coordinate system, an optimized TransScaledRasterCs can perform both conversions at once. More complex transformations can easily be handled with an internal transformation matrix. Collapsing frequently visited nodes reduces the depth of recursion in the algorithm as well as reducing the number of work points created.

The overhead of coordinate system checking may be very costly in places where coordinate systems are not at issue and efficiency is of great concern. For instance, in an image filter resampler, points are coming in and leaving the FilterResampler in their respective input and output coordinate systems. However, a number of calculations have to be performed while inside the FilterResampler object. Once a point is in the appropriate coordinate system for the resampler, continued coordinate system verifications are unnecessary and can be very costly. For 80% of the processing needs, the overhead associated with a CoordSys check is insignificant compared to the run-time safety they provide. However, for the 20% of tightly looped code where the major processing is occurring, extra if checks can be devastating.

All CoordSys geometric objects provide a means of accessing the raw elemental components so programmers can opt for efficiency over safety. The general rule of thumb is geometric objects are passed into and out of public interfaces as CoordSys objects while internally (once an initial check or conversion is performed) they can be accessed as raw geometric objects if required.

Some less significant performance increases can be obtained by providing specialized classes for 2d and 3d coordinate systems. This allow direct access to coordinate system components without the overhead of looping control structures and data accesses indirectly through an array. This is based on the premise that most coordinate system transformations are performed on 2d and 3d geometric objects and only a few isolated cases will require the generalization of N-dimensinoal objects.

The last optimization is in the conversion algorithm itself. A slight optimization is made for the special case when converting from any coordinate system to the root. Since the direction of traversal is guaranteed to always be in an upward direction, a tighter conversion algorithm is supplied that requires no recursion and fewer test conditions. In addition, the conversion algorithm is also smart enough to avoid redundant conversions and will always traverse the shortest path between any two nodes in the conversion tree.

Another aspect of the present invention is to provide a method for converting between source coordinates in a source coordinate system and target coordinates in a target coordinate system comprising the step of defining at least a portion of a coordinate system conversion tree extending from a common coordinate system and branching to the source and target coordinate systems with at least one intervening intermediate conversion system therebetween. Coordinate conversions are preferably performed between the source and target coordinates along branches extending from the source coordinate system to the common coordinate system and to the target coordinate system. The coordinates preferably have contextual data associated therewith for each respective coordinate system for performing coordinate conversions with at least one adjacent coordinate system.

Yet another aspect of the present invention is to provide a machine readable medium having machine readable instructions thereon for causing a computer to convert between source coordinates in a source coordinate system and target coordinates in a target coordinate system according to the methods discussed above.

Figure 13:
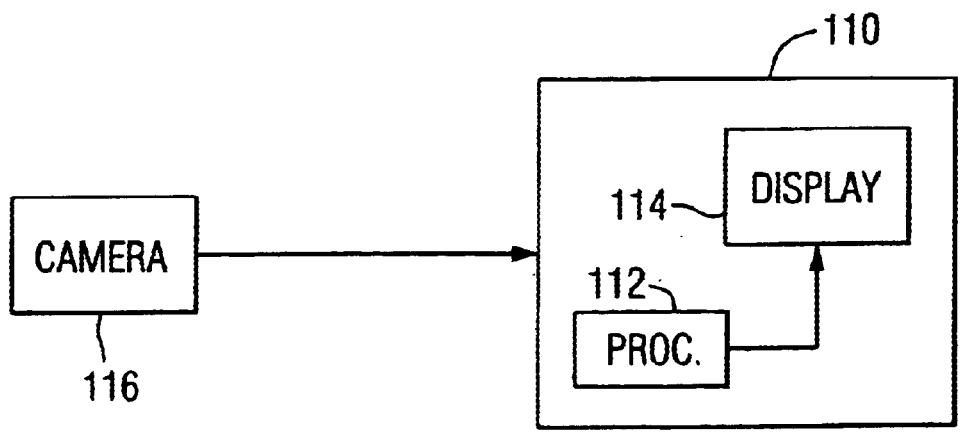
FIG. 13 is a block diagram of an apparatus in accordance with the present invention.

Another aspect of the present invention is to provide an apparatus 110 comprising a processor 112 for converting data image points between source coordinates in a. source coordinate system 10 and target coordinates in a target coordinate system 20, as shown in FIG. 13. The processor 112 preferably comprises an algorithm for performing the step of defining at least a portion of a coordinate system conversion tree 22 extending from a common coordinate system. 26 and branching to the source and target coordinate systems 10, 20 with at least one intervening intermediate conversion system therebetween. Coordinate conversions of the data image points are preferably performed between the source and target coordinates along branches extending from the source coordinate system 10 to the common coordinate system 26 and to the target coordinate system 20.

The coordinates preferably have contextual data associated therewith for each respective coordinate system for performing coordinate conversions with at least one adjacent coordinate system. The apparatus 110 includes a display 114 for displaying converted data image points in the target coordinate system. The data image points are provided by a camera 116 carried by a satellite, for example.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for converting between source coordinates in a source coordinate system and target coordinates in a target coordinate system comprising the steps of:
    defining a coordinate system conversion tree extending from a root coordinate system and branching to a plurality of other coordinate systems including the source and target coordinate systems so that the source and target coordinate systems are connected to a common coordinate system other than the root coordinate system, the root coordinate system is not being defined relative to another coordinate system so that it represents a root node in the conversion tree, and the common coordinate system is being defined relative to the root coordinate system; and
    performing coordinate conversions between the source and target coordinates along branches extending from the source coordinate system to the common coordinate system and to the target coordinate system without returning to the root coordinate system.

2. A method according to claim 1 further comprising the step of associating contextual data with respective coordinates of each coordinate system for performing coordinate conversions with at least one adjacent coordinate system.

3. A method according to claim 2 wherein the step of associating contextual data comprises associating contextual data with respective coordinates of each coordinate system for performing coordinate conversion with only one adjacent coordinate system.

4. A method according to claim 1 wherein performing coordinate conversions comprises sequentially performing coordinate conversions up the coordinate system conversion tree from the source coordinate system to at least one adjacent coordinate system until a conversion is made with the common coordinate system.

5. A method according to claim 1 wherein performing coordinate conversions comprises sequentially performing coordinate conversions down the coordinate system conversion tree from the common coordinate system to at least one adjacent coordinate system until a conversion is made with the target coordinate system.

6. A method according to claim 1 further comprising the step of displaying an image of the converted coordinates in the target coordinate system.

7. A method according to claim 1 further comprising the steps of:
    adding an additional coordinate system to the coordinate system conversion tree; and verifying whether the additional coordinate system is connected to at least one other coordinate system via a common coordinate system, and performing conversions if the verifying is successful.

8. A method according to claim 7 further comprising the step of providing a warning if the step of verifying is unsuccessful.

9. A method according to claim 1 wherein each of the coordinate systems comprises a geospatial coordinate system.

10. A method according to claim 1 wherein each of the coordinate systems comprises an n-dimensional coordinate system.

11. A method for converting between source coordinates in a source coordinate system and target coordinates in a target coordinate system comprising the steps of:

defining a coordinate system conversion tree extending from a root coordinate system and branching to a plurality of other coordinate systems including the source and target coordinate systems so that the source and target coordinate systems are connected to a common coordinate system other than the root coordinate system with at least one intervening intermediate conversion system therebetween, the root coordinate system is not being defined relative to another coordinate system so that it represents a root node in the conversion tree, and the common coordinate system is being defined relative to the root coordinate system; and performing coordinate conversions between the source and target coordinates along branches extending from the source coordinate system to the common coordinate system and to the target coordinate system without returning to the root coordinate system, the coordinates having contextual data associated therewith for each respective coordinate system for performing coordinate conversions with at least one adjacent coordinate system.

12. A method according to claim 11 wherein the coordinates have contextual data associated therewith for each respective coordinate system for performing coordinate conversion with only one adjacent coordinate system.

13. A method according to claim 11 wherein performing coordinate conversions comprises sequentially performing coordinate conversions up the portion of the coordinate system conversion tree from the source coordinate system to at least one adjacent coordinate system until a conversion is made with the common coordinate system.

14. A method according to claim 11 wherein performing coordinate conversions comprises sequentially performing coordinate conversions down the portion of the coordinate system conversion tree from the common coordinate system to at least one adjacent coordinate system until a conversion is made with the target coordinate system.

15. A method according to claim 11 further comprising the step of displaying an image of the converted coordinates in the target coordinate system.

16. A method according to claim 11 further comprising the steps of:

adding an additional coordinate system to the portion of the coordinate system conversion tree; and verifying whether the additional coordinate system is connected to at least one other coordinate system via a common coordinate system, and performing conversions if the verifying is successful.

17. A method according to claim 16 further comprising the step of providing a warning if the step of verifying is unsuccessful.

18. A method according to claim 11 wherein each of the coordinate systems comprises a geospatial coordinate system.

19. A method according to claim 11 wherein each of the coordinate systems comprises an n-dimensional coordinate system.

20. A machine readable medium having machine readable instructions thereon for causing a computer to convert between source coordinates in a source coordinate system and target coordinates in a target coordinate system by performing the steps of:

defining a coordinate system conversion tree extending from a root coordinate system and branching to a plurality of other coordinate systems including the source and target coordinate systems so that the source and target coordinate systems are connected to a common coordinate system other than the root coordinate system with at least one intervening intermediate conversion system therebetween, the root coordinate system is not being defined relative to another coordinate system so that it represents a root node in the conversion tree, and the common coordinate system is being defined relative to the root coordinate system; and performing coordinate conversions between the source and target coordinates along branches extending from the source coordinate system to the common coordinate system and to the target coordinate system without returning to the root coordinate system, the coordinates having contextual data associated therewith for each respective coordinate system for performing coordinate conversions with at least one adjacent coordinate system.

21. A machine readable medium according to claim 20 wherein the coordinates have contextual data associated therewith for each respective coordinate system for performing coordinate conversion with only one adjacent coordinate system.

22. A machine readable medium according to claim 20 wherein performing coordinate conversions comprises sequentially performing coordinate conversions up the portion of the coordinate system conversion tree from the source coordinate system to at least one adjacent coordinate system until a conversion is made with the common coordinate system.

23. A machine readable medium according to claim 20 wherein performing coordinate conversions comprises sequentially performing coordinate conversions down the portion of the coordinate system conversion tree from the common coordinate system to at least one adjacent coordinate system until a conversion is made with the target coordinate system.

24. A machine readable medium according to claim 20 further comprising the step of displaying an image of the converted coordinates in the target coordinate system.

25. A machine readable medium according to claim 20 further comprising the steps of:

adding an additional coordinate system to the portion of the coordinate system conversion tree; and verifying whether the additional coordinate system is connected to at least one other coordinate system via a common coordinate system, and performing conversions if the verifying is successful.

26. A machine readable medium according to claim 25 further comprising the step of providing a warning if the step of verifying is unsuccessful.

27. A machine readable medium according to claim 20 wherein each of the coordinate systems comprises a geospatial coordinate system.

28. A machine readable medium according to claim 20 wherein each of the coordinate systems comprises an n-dimensional coordinate system.

29. An apparatus comprising:

a processor for converting image data at source coordinates in a source coordinate system to converted image data at target coordinates in a target coordinate system, said processor performing the steps of defining a coordinate system conversion tree extending from a root coordinate system and branching to a plurality of other coordinate systems including the source and target coordinate systems so that the source and target coordinate systems are connected to a common coordinate system other than the root coordinate system with at least one intervening intermediate conversion system therebetween, the root coordinate system is not being defined relative to another coordinate system so that it represents a root node in the conversion tree, and the common coordinate system is being defined relative to the root coordinate system, and performing coordinate conversions between the source and target coordinates along branches extending from the source coordinate system to the common coordinate system and to the target coordinate system without returning to the root coordinate system, the coordinates having contextual data associated therewith for each respective coordinate system for performing coordinate conversions with at least one adjacent coordinate system; and a display connected to said processor for displaying converted image data in the target coordinate system.

30. An apparatus according to claim 29 wherein the coordinates have contextual data associated therewith for each respective coordinate system for performing coordinate conversion with only one adjacent coordinate system.

31. An apparatus according to claim 29 wherein performing coordinate conversions comprises sequentially performing coordinate conversions up the portion of the coordinate system conversion tree from the source coordinate system to at least one adjacent coordinate system until a conversion is made with the common coordinate system.

32. An apparatus according to claim 29 wherein performing coordinate conversions comprises sequentially performing coordinate conversions down the portion of the coordinate system conversion tree from the common coordinate system to at least one adjacent coordinate system until a conversion is made with the target coordinate system.

33. An apparatus according to claim 29 further comprising the steps of:

adding an additional coordinate system to the portion of the coordinate system conversion tree; and verifying whether the additional coordinate system is connected to at least one other coordinate system via a common coordinate system, and performing conversions if the verifying is successful.

34. An apparatus according to claim 33 further comprising the step of providing a warning to said display if the step of verifying is unsuccessful.

35. An apparatus according to claim 29 wherein each of the coordinate systems comprises a geospatial coordinate system.

36. An apparatus according to claim 29 wherein each of the coordinate systems comprises an n-dimensional coordinate system.

* * * * *

UNITED STATES PATENT AND TRADEMARK OFFICE
CERTIFICATE OF CORRECTION

PATENT NO.    : 6,766,343 B1
DATED         : July 20, 2004
INVENTOR(S)   : Bell et al.

It is certified that error appears in the above-identified patent and that said Letters Patent is hereby corrected as shown below:

Column 1,
Line 4, insert -- GOVERNMENT LICENSE RIGHTS
The U.S. Government has a paid-up license in this invention and the right in limited circumstances to require the patent owner to license others on reasonable terms as provided for by the terms of contract no. 97-K246500-000, awarded by National Geospatial-Intelligence Agency. --

Signed and Sealed this

Twenty-eighth Day of December, 2004

JON W. DUDAS
*Director of the United States Patent and Trademark Office*